United States Patent
Tang

(10) Patent No.: US 9,587,476 B2
(45) Date of Patent: Mar. 7, 2017

(54) SINGLE COMPONENT RESIN SYSTEMS AND METHODS RELATING THERETO

(71) Applicant: Halliburton Energy Services, Inc., Houston, TX (US)

(72) Inventor: Tingji Tang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 366 days.

(21) Appl. No.: 13/734,100

(22) Filed: Jan. 4, 2013

(65) Prior Publication Data

US 2014/0190697 A1 Jul. 10, 2014

(51) Int. Cl.
| | |
|---|---|
| C09K 8/64 | (2006.01) |
| E21B 43/267 | (2006.01) |
| C09K 8/565 | (2006.01) |
| C09K 8/57 | (2006.01) |
| C09K 8/575 | (2006.01) |
| C09K 8/66 | (2006.01) |
| C09K 8/68 | (2006.01) |
| C09K 8/80 | (2006.01) |

(52) U.S. Cl.
CPC ............ *E21B 43/267* (2013.01); *C09K 8/565* (2013.01); *C09K 8/572* (2013.01); *C09K 8/575* (2013.01); *C09K 8/64* (2013.01); *C09K 8/665* (2013.01); *C09K 8/68* (2013.01); *C09K 8/805* (2013.01)

(58) Field of Classification Search
CPC . C09K 8/805; C09K 8/68; C09K 8/80; C09K 8/5751; C09K 8/508; C09K 8/5753; C09K 8/62; C09K 8/685; C09K 8/5083; C09K 2208/08; C09K 8/56; C09K 8/575; C09K 8/70; C09K 8/502; C09K 8/506; C09K 8/03; C09K 8/035; C09K 8/50; C09K 8/516; C09K 8/565; C09K 8/572; C09K 8/5756; C09K 8/64; C09K 8/665; C09K 8/703; C09K 8/74; C09K 8/76; E21B 43/267; E21B 43/025; E21B 43/26; E21B 43/114; E21B 43/261; E21B 43/003; E21B 43/04; E21B 43/16; E21B 37/06; E21B 37/08
See application file for complete search history.

(56) References Cited

U.S. PATENT DOCUMENTS

| | | | |
|---|---|---|---|
| 3,497,008 A * | 2/1970 | Graham | E21B 43/267 166/280.1 |
| 3,956,237 A | 5/1976 | Doorakian et al. | |
| 5,609,207 A | 3/1997 | Dewprashad et al. | |
| 6,649,673 B2 | 11/2003 | Browning et al. | |
| 7,153,575 B2 | 12/2006 | Anderson et al. | |
| 2004/0147690 A1 | 7/2004 | Watkins et al. | |
| 2007/0289781 A1 * | 12/2007 | Rickman | C09K 8/68 175/65 |
| 2010/0212898 A1 * | 8/2010 | Nguyen | C08G 77/04 166/280.1 |
| 2010/0282465 A1 * | 11/2010 | Weaver | C09K 8/575 166/293 |
| 2010/0282468 A1 * | 11/2010 | Willberg | C09K 8/62 166/305.1 |
| 2012/0205101 A1 | 8/2012 | Pribytkov et al. | |

FOREIGN PATENT DOCUMENTS

WO 2014107423 A1 7/2014

OTHER PUBLICATIONS

Saunders et. al. Mechanism of the tertiary amine-catalyzed dicyandiamide cure of epoxy resins, Journal of polymer science: Part A-1, 1967, 5, 1609-1617.*
D. A. Unruh, S. J. Pastine, J. C. Moreton, and J. M. J. Frechet, Thermally activated single component epoxy system, Macromolecules, 2011, 44, 6318-6325.*
Unruh et al., "Thermally Activated, Single Component Epoxy Systems," Macromolecules 2011, 44, 6318-6325.
Product Data Sheet, Epoxy Curing Agents—BSI Branded Products, Brenntag Specialties, Inc., 2010.
Ajicure, Latent Curing Agents and Accelerators for Epoxy Resin, Ajinomoto Fine-Techno Co., Inc. Functional Chemicals Div., 2601-00-20-01, T-E1-4, 99/2(1), LAB, revised 02/3(2).
Chae et al., "One Component Photo-Curing Agent for Epoxy Resins Based on Multifunctional Photobase Generators Containing Oxime-Urethane Groups," Polym. Adv. Technol. 2011, 22 1427-1433.
International Search Report and Written Opinion for PCT/US2013/078208 dated Apr. 22, 2014.

* cited by examiner

*Primary Examiner* — Kumar R Bhushan
(74) *Attorney, Agent, or Firm* — McDermott Will & Emery LLP; Craig Roddy

(57) ABSTRACT

A method of use of single component resins to strengthen structural features in subterranean formations includes providing particulates, a carrier fluid, a curable resin and a latent curing agent. The curable resin is not cured by the latent curing agent at room temperature, standard pressure or neutral pH. The particulates are coated with the curable resin and the latent curing agent to create resin-coated particulates. A slurry of resin-coated particulates is created in the carrier fluid, and placed into a portion of a subterranean formation and allowing the latent curing agent to cure the curable resin to form cured, resin-coated particulates.

9 Claims, 1 Drawing Sheet

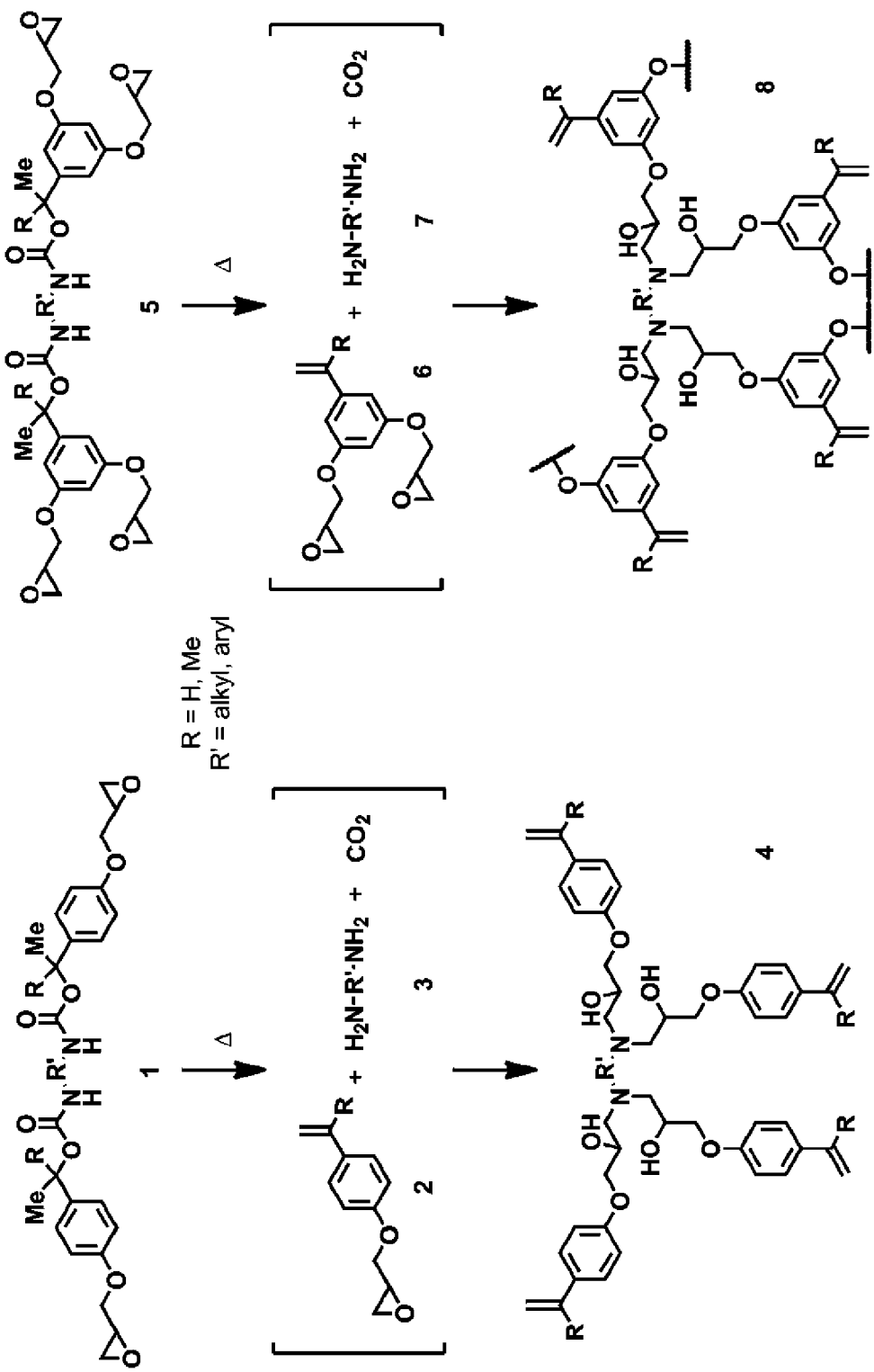

SINGLE COMPONENT RESIN SYSTEMS AND METHODS RELATING THERETO

BACKGROUND

The present invention relates to the use of resins in subterranean applications, and more particularly, to the use of single component resin systems to strengthen structural features in subterranean formations.

Oil or gas is naturally occurring in certain subterranean formations. A subterranean formation having sufficient porosity and permeability to store and transmit fluids is referred to as a reservoir. A subterranean formation that is a reservoir for oil or gas may be located under land or under a seabed offshore. Oil or gas reservoirs are typically located in the range of a few hundred feet (shallow reservoirs) to a few tens of thousands of feet (ultra-deep reservoirs) below the ground or seabed.

In order to produce oil or gas, a wellbore is drilled into a subterranean formation that is an oil or gas reservoir. A wellbore can be cased or uncased (openhole). A wellbore can have vertical and horizontal portions, and it can be straight, curved, or branched.

Various types of treatments are commonly performed on wells or subterranean formations penetrated by wells. For example, stimulation is a type of treatment performed on a subterranean formation to restore or enhance the productivity of oil or gas from the subterranean formation. Stimulation treatments fall into two main groups: hydraulic fracturing and matrix treatments. In hydraulic fracturing treatments, a viscous fracturing fluid, which also functions as a carrier fluid, is pumped into a portion of a subterranean formation at a rate and pressure such that the subterranean formation breaks down and one or more fractures are created or enhanced. Typically, particulate solids, such as graded sand, are suspended in a portion of the fracturing fluid and then deposited in the fractures. These particulate solids, or proppant particulates, serve to prevent the fractures from fully closing once the hydraulic pressure is removed. By keeping the fracture from fully closing, the proppant particulates aid in forming conductive paths through which fluids may flow.

Matrix treatments are performed below the fracture pressure of a subterranean formation. Matrix treatments can include, for example, treatments to consolidate a matrix of unconsolidated rock particles so that less particulates are produced with the produced hydrocarbon.

Occasionally, formation fines and/or other unconsolidated particulates placed in the subterranean formation during a fracturing, gravel packing, or frac-pack operation may migrate out of the subterranean formation into a well bore and/or may be produced with the oil, gas, water, and/or other fluids produced by the well. The presence of such particulates, whether they are indigenous or added to the subterranean formation, in produced fluids is undesirable in that the particulates may abrade pumping and other producing equipment and/or reduce the production of desired fluids from the well. Moreover, particulates that have migrated into a well bore (e.g., inside the casing and/or perforations in a cased hole), among other things, may clog portions of the well bore, hindering the production of desired fluids from the well. The term "unconsolidated particulates," and derivatives thereof, is defined herein to include loose particulates and particulates bonded with insufficient bond strength to withstand the forces created by the production of fluids through the formation. Unconsolidated particulates may comprise, among other things, sand, gravel, fines and/or proppant particulates in the subterranean formation.

One technique used in formation consolidation, fines migration control, or other methods to control unconsolidated particulates has been to coat the particulates with a curable resin prior to their introduction into the subterranean formation and allowing the resin to consolidate the particulates once inside the formation. In general, the resin enhances the grain-to-grain, or grain-to-formation, contact between particulates and/or subterranean formation so that the particulates are stabilized, locked in place, or at least partially immobilized such that they are resistant to flowing with produced or injected fluids.

Another method used to control particulate matter in unconsolidated formations involves consolidating unconsolidated subterranean producing zones into hard permeable masses by preflushing the formation, applying a hardenable resin composition, applying a spacer fluid, applying an external catalyst to cause the resin to set, and applying an afterflush fluid to remove excess resin from the pore spaces of the zones. Such multiple-component applications, however, may be problematic. For example, when an insufficient amount of spacer fluid is used between the application of the hardenable resin and the application of the external catalyst, the resin may come into contact with the external catalyst in the well bore itself rather than in the unconsolidated subterranean producing zone. When resin is contacted with an external catalyst an exothermic reaction occurs that may result in rapid polymerization. The polymerization may damage the formation by plugging the pore channels, may halt pumping when the well bore is plugged with solid material, or may even result in a downhole explosion as a result of the heat of polymerization.

In addition, when using conventional resin systems, equipment used in the wellbore may come in accidental contact with the resin. If the curing agent has been added to the resin, the mixture begins to cure on the equipment, causing the equipment to become coated with the cured resin. As a result, the equipments requires extensive cleaning before further use, thereby resulting in increased cost from cleaning and delay in operations. Likewise, using these conventional processes to treat long intervals of unconsolidated regions is often not practical due to the difficulty in determining if the entire interval has been treated with both the resin and the catalyst. Also, the temperature of the subterranean formation may hamper the ability of the hardenable resin to cure. Hence, multiple hardenable resins may be needed depending on the subterranean formation's temperature at the region being treated.

In addition, often times during field operations, the components may be mixed, but then unforeseen circumstances arise that prevent the mixture to be pumped down hole. In these situations, the mixture hardens and is unusable, leading to higher costs. because the hardened mixture must then be discarded, and a fresh batch of resin must be made.

SUMMARY OF THE INVENTION

The present invention relates to the use of resins in oil well applications, and more particularly, the use of single component resins to control particulate migration in subterranean formations.

In some embodiments, the present invention provides a method comprising providing particulates, a carrier fluid, a curable resin and a latent curing agent, wherein the curable resin is not cured by the latent curing agent at room temperature, standard pressure or neutral pH; coating the particulates with the curable resin and the latent curing agent to create resin-coated particulates; creating a slurry of resin-coated particulates in the carrier fluid; placing the slurry into a portion of a subterranean formation; and allowing the latent curing agent to cure the curable resin to form cured, resin-coated particulates.

In other embodiments, the present invention provides a method comprising placing a flush fluid comprising a carrier fluid, a curable resin and a latent curing agent, wherein the curable resin is not cured by the latent curing agent at room temperature, standard pressure or neutral pH, into a portion of a subterranean formation comprising particulates and allowing the curable resin and latent curing agent to coat at least a portion of the particulates; and allowing the latent curing agent to cure the curable resin on the particulate surfaces within the subterranean formation to form cured, resin-coated particulates.

In still other embodiments, the present invention provides a method comprising: introducing a fracturing fluid containing proppant into a subterranean formation at a pressure sufficient to create or enhance at least one fracture therein; providing a treatment fluid comprising a carrier fluid, and a curable resin and a curing agent, wherein the curable resin is not cured by the curing agent at room temperature, standard pressure or neutral pH; introducing the treatment fluid into the at least one fracture of the subterranean formation; and allowing the curing agent to cure the curable resin, thereby forming a resinous proppant pack therein.

The features and advantages of the present invention will be readily apparent to those skilled in the art upon a reading of the description of the preferred embodiments that follows.

BRIEF DESCRIPTION OF THE DRAWINGS

The following FIGURES are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

FIG. 1 is a diagram of a reaction pathway for single molecule curable resin/curing agents to be activated to form a cured resin.

DETAILED DESCRIPTION

The present invention relates to the use of resins in oil well applications, and more particularly, the use of single component resins to strengthen structural features in subterranean formations.

The single component resin systems described herein would allow for long term storage of a curable resin. Long term storage would allow for a resin that may be used immediately, without mixing of components at the wellsite, while also allowing for the resin to be stable under room temperature and stored for periods of time. Thus, unwanted formation of the cured resin may be prevented under normal conditions, as opposed to conventional resin systems, in which immediate curing occurs when the curable resin is mixed with the curing agent. Additionally, the formation of the cured resin may be more readily controlled. As such, additional benefits resulting from single component resin systems include ease of operation, as well as ease of logistics, since the component does not need to be mixed at the well site.

In order to ensure that unconsolidated particulates are made into a stable structure created downhole, such as within a fracture, a method comprises providing particulates, a carrier fluid, a curable resin and a curing agent. The curable resin is not cured by the curing agent at room temperature, standard pressure or neutral pH. Because of this, the curable resin and the curing agent may be stored together as a single component system.

Particulates, or proppant particulates when used in fracturing (or "solids" in the case of solids-laden gel bodies) suitable for use in the methods of the present invention may be of any size and shape combination known in the art as suitable for use in a downhole operation. Generally, where the chosen particulate is substantially spherical, suitable particulates have a size in the range of from about 2 to about 400 mesh, U.S. Sieve Series. In some embodiments of the present invention, the particulates have a size in the range of from about 8 to about 120 mesh, U.S. Sieve Series. A major advantage of using this method is there is no need for the solid particulates to be sieved or screened to a particular or specific particle mesh size or particular particle size distribution, but rather a wide or broad particle size distribution can be used.

In some embodiments of the present invention it may be desirable to use substantially non-spherical particulates. Suitable substantially non-spherical particulates may be cubic, polygonal, fibrous, or any other non-spherical shape. Such substantially non-spherical particulates may be, for example, cubic-shaped, rectangular-shaped, rod-shaped, ellipse-shaped, cone-shaped, pyramid-shaped, or cylinder-shaped. That is, in embodiments wherein the particulates are substantially non-spherical, the aspect ratio of the material may range such that the material is fibrous to such that it is cubic, octagonal, or any other configuration. Substantially non-spherical particulates are generally sized such that the longest axis is from about 0.02 inches to about 0.3 inches in length. In other embodiments, the longest axis is from about 0.05 inches to about 0.2 inches in length. In one embodiment, the substantially non-spherical particulates are cylindrical having an aspect ratio of about 1.5 to 1 and about 0.08 inches in diameter and about 0.12 inches in length. In another embodiment, the substantially non-spherical particulates are cubic having sides about 0.08 inches in length. The use of substantially non-spherical particulates may be desirable in some embodiments of the present invention because, among other things, they may provide a lower rate of settling when slurried into a fluid as is often done to transport particulates to desired locations within subterranean formations. By so resisting settling, substantially non-spherical particulates may provide improved particulate distribution as compared to more spherical particulates.

Particulates suitable for use in the present invention may comprise any material suitable for use in subterranean operations. Suitable materials for these particulates include, but are not limited to, sand, bauxite, ceramic materials, glass materials, polymer materials (such as EVA or composite materials), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof. Moreover, fibrous materials, may be included in certain embodiments of the present invention.

Carrier fluids for use in conjunction with the present invention may include, but not be limited to, oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols, e.g., methanol, ethanol, n-propanol, isopropanol, n-butanol, sec-butanol, isobutanol, and t-butanol; glycerins; glycols, e.g., polyglycols, propylene glycol, and ethylene glycol; polyglycol amines; polyols; any derivative thereof; any in combination with salts, e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; any in combination with an aqueous-based fluid; and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween.

Resins suitable for use in the present invention include all resins known in the art that are capable of forming a hardened, consolidated mass. Many such resins are commonly used in subterranean consolidation operations, and some suitable resins include epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, silicon-based resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing. By way of example, a silicon-based resin system as described in U.S. Patent Application Publication 2010/0212898, the entire disclosure of which is hereby incorporated by reference, may be used as a more eco-friendly choice in cases where epoxy or furan-based resins pose environmental concerns.

Some examples of curing agents for use with the curable resins in the present invention include latent curing agents. Latent curing agents are mixtures of curing agents with epoxy resin that can be stably stored together at room temperature, standard pressure and/or neutral pH. In some embodiments, the latent curing agents may have a shelf life of over six months. Latent curing agents having extended shelf lives allow for ease of operation, and Examples of latent curing agents include those selected from the group consisting of Lewis acid-amine complexes, dicyandiamides, urea-based complexes, thiourea based complexes and organic-acid hydrazides.

Examples of Lewis acids for use in as curing agents in the present invention include boron trifluoride ($BF_3$), zinc dichloride ($ZnCl_2$), Tin tetrachloride ($SnCl_4$), Ferric chloride ($FeCl_3$) and aluminum trichloride ($AlCl_3$). Lewis acids generally react with resins at room temperature. In the present invention, Lewis acids may be used in the form of complexes with amines to form a latent curing agent. The Lewis acid-amine complexes do not react at room temperature and may be stored with curing resins.

In other embodiments of the present invention, the curable resin may comprise a compound have a structure according to the general formula (I):

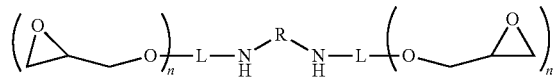

where L is a leaving group, R is a cyclic or acyclic alkyl or alkenyl group of 1 to 20 carbon atoms, and n=1 or 2.

Compounds of general formula (I) contain both epoxides, which serve as the curable resin part, and amine hardeners, which serve as the curing agent, within the same molecule. However, in general formula (I), the amines are not free to react with the epoxide groups under normal conditions due to the latency of the amines from being bound to the leaving group.

One example of a compound of general formula (I) is Compound 1 below:

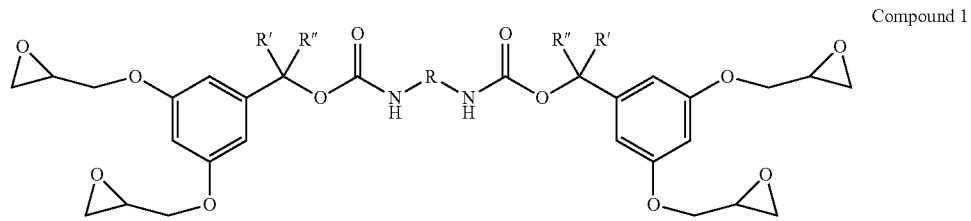

Compound 1 wherein R, R' and R" may be the same or different and comprise a cyclic or acyclic alkyl or alkenyl group of 1 to 20 carbon atoms.

In Compound 1, the amines is held latent by a carbamate linkage. Upon activation by either heat, pressure or pH, the carbamate linkage may cleave, and active the amines. Thus, the carbamate linkage serves as a leaving group which, when it cleaves from the amine, provides an activated primary amine. The activated amines may then react, as shown in FIG. 1, to form epoxides which crosslink. The overall process of deprotection and curing of single component epoxies is summarized in FIG. 1. In contrast to phenyl carbamate, a functionality commonly used in a blocked isocyanate, which thermally decomposes into an isocyanate and a phenol, the carbamate moieties of epoxy precursors 1 and 5 undergo entropically favorable thermal decomposition to yield carbon dioxide, an eliminated alkene 2 and 6, and a primary diamine 3 and 7. Because the eliminated alkene contains at least one epoxide moiety, it can react with the newly formed primary amine, and form a resin. In practice, the epoxy precursor should contain at least two latent amines and four epoxy moieties, such as 5 in order to produce a cross-linked epoxy thermoset. However, other embodiments may use latent curing agents that have only one primary amine and two epoxy moieties to form the thermoset resin.

Before introduction into a subterranean formation, resins may be pre-coated onto particulates or included in fracturing treatment fluids to coat the particulates downhole. Ideally, the resin is generally capable of preventing particulate migration out of the formation and thus promotes the consolidation of particulates to one another to form cured, resin-coated particulates. To coat the formation fines or other particulates with the curable resin and curing agent, the particles may be added to a mixture of the curable resin and curing agent. The concentration of resin used in the treatment fluid may be any concentration suitable for use downwell. In some embodiments, the concentration of the resin is about 3% to about 5% of the total weight of fines or other particulates, such as sand/proppant.

Once the particulates have been coated with the resin, a slurry of resin-coated particles in the carrier fluid can be formulated. The slurry may then be placed in a subterranean formation and allowed to cure. Because the curable resin and curing agent do not immediately react together to begin curing, wellbore operators may control the timing of the curing process, and thereby provide greater flexibility over oil extraction operations.

In other embodiments, the mixture of curable resin and curing agent may be formulated in a flush fluid. The flush fluid may then be placed in a portion of a subterranean formation comprising particulates to be coated. In general, when used in a remedial or proactive treatment, the curable resin compositions, flush fluids of the present invention may be bullheaded into the well, i.e., pumped into the well bore without the use of isolation tools or barrier devices under the assumption that the fluid will be placed into a target area, or placed using coiled tubing or jointed pipe to treat intervals of interest. In some embodiments, mechanical isolation devices and packers may be used in combination with coiled tubing or jointed pipe to divide the well bore into shorter intervals. A pressure pulsing tool or rotating jetting tool may also be coupled with the coiled tubing or jointed pipe to enhance the placement of the fluid into an interval. For example, a pressure pulsing tool based on fluid-oscillation may be used to create pulsating pressure waves within the well bore and formation fluids to enhance the penetration of the treatment fluids further into the fractures and formations.

After application of the curable resin composition and any flush fluids, the well may be shut in for a period of time to allow the curable resin to cure. The amount of time necessary for the resin to cure sufficiently may depend on temperature, pH, pressure, and/or the composition of the resin. In some embodiments, positive pressure may be maintained in the well bore during shut in to prevent or reduce fluid swabbing into the well bore from the formations surrounding the well bore. Similarly, positive pressure may be maintained in the well bore during the removal of the equipment used to place the curable resin composition, flush fluid to similarly prevent or reduce fluid swabbing.

In some preferred embodiments, the subterranean formation may be treated with the slurry to form a stabilizing substance during the action of creating the fracture within the subterranean formation. These embodiments may be preferred because, among other benefits, they remove the requirement of an additional operation before fracturing and forming the high-porosity fracture and because, unlike in a matrix operation, if the stabilizing substance is present while the fracture faces are created, then coverage of the substance over the majority of the fracture face is more. For example, the treatment of stabilizing substance can be performed during injection of pre-pad or pad fluid stage that initiates the fracture of the formation prior to the injection of the main fracturing fluid stage containing slurry. The stabilizing substance is allowed to penetrate the formation matrix surrounding (or close to the vicinity of) the fracture faces.

In order to stabilize the surrounding formation, methods of the present invention use the slurry of resin-coated particles in the carrier fluid to consolidate the formation, at least at the fracture faces that abut the resin-coated particulates once the fracture is allowed to return to closure pressure. In some embodiments, a stabilizing substance may be placed into the subterranean formation surrounding a well bore at the desired intervals where the fractures are placed and allowed to penetrate into the formation at a matrix flow rate. As used herein, "matrix flow" refers to the placement of a fluid at pressure below the fracturing pressure such that it penetrates a distance into the matrix of formation particles without creating or extending fractures therein. One skilled in the art will recognize that, depending on the stabilizing substance chosen, it may be necessary to then shut-in the treated portion of the formation to allow the stabilizing substance to cure.

In some embodiments, the cured, resin-coated particulates may form, for example, a resinous proppant pack. The resin may act to improve the clustering capacity, tensile strength, and flowback control ability of the proppant pack. Resins may additionally promote homogeneous distribution of the proppant particulates within the proppant pack by reducing or preventing any tendency of them to flow out of the proppant pack within the fracture in the subterranean formation. Resins may be particularly useful if the proppant particulates used in a particular fracturing operation have a low density or specific gravity.

Various conditions may be used to activate the latent curing agents. For example, the temperature, pH or pressure in the subterranean formation may be utilized or altered in order to cause the latent curing agents to form cured, resin-coated particulates.

In a subterranean formation, the temperature may be higher than at the surface of the well. Temperatures may be upwards of about 150° F. Temperatures may be upwards of about 250° F. In some embodiments, when the slurry is placed into a portion of a subterranean formation, the slurry is exposed to a temperature of about 150° F. or greater to activate the curing agent to cure the curable resin to form the cured, resin-coated particulates.

Subterranean formations may also have pressures higher than on the surface. To utilize this pressure difference, in other examples, the slurry is exposed to a pressure of greater than 1 atmosphere to activate the curing agent to cure the curable resin to form the cured, resin-coated particulates.

In other examples, the pH of a subterranean formation may be changed to cause pH-sensitive compounds to react. In some examples, latent curing agents may be activated by acidic conditions (pH<7), whereas in other examples, latent curing agents may be activated by basic conditions (pH>7). Any suitable pH changing materials may be used. Examples of pH lowering materials include N-Flow 408® or N-Flow 412®, delayed acid generating products available from Halliburton Energy Services of Houston, Tex. N-Flow 408® is an example of a product that will generate acid when it is exposed to elevated temperatures. Other pH lowering materials may include inorganic acids. Examples of suitable inorganic acids include, but are not limited to, hydrochloric acid, hydrofluoric acid, hydrobromic acid, sulfuric acid, phosphoric acid, and nitric acid. Examples of suitable pH raising materials include any standard base, such as sodium hydroxide, potassium hydroxide, ammonium hydroxide, sodium carbonate, potassium carbonate, and the like.

In some embodiments, subsequent to placing the curable resin composition in the formation, the subterranean formation may be fractured. This fracturing step may include the introduction of a fracturing fluid containing proppant into a subterranean formation at a pressure sufficient to create or enhance at least one fracture. The proppant may contain a plurality of particulates such as those discussed above. In some embodiments, at least a portion of the particulates may be coated with the curable resin compositions of the present invention. In some embodiments, the coated particulates may be introduced via a treatment fluid comprising a carrier fluid, a curable resin and a curing agent at the end of the fracturing treatment.

In some embodiments, at least a plurality of the particulates may be of a larger size, such that the fracture has a higher conductivity. For example, the size of at least a plurality of the particulates may have a weight mean particle size ("d50") of about 20 times to about 50 times the d50 of the formation particulates.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:

introducing a fracturing fluid containing proppant into a subterranean formation having formation particulates therein at a pressure sufficient to create or enhance at least one fracture having a proppant pack therein wherein at least a portion of the proppant has a weight mean particle size between 20 times and 50 times the weight mean particle size of the formation particulates;

providing a treatment fluid comprising a carrier fluid and a curable compound according to the general formula (1):

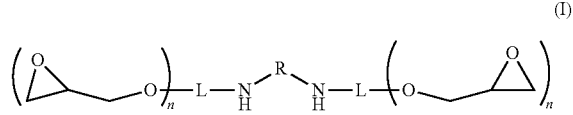

wherein L is a carbamate linkage, R is a cyclic or acyclic alkyl or alkenyl group of 1 to 20 carbon atoms, and n=1 or 2, wherein the compound is not cured at room temperature, standard pressure or neutral pH;

introducing the treatment fluid into the at least one fracture wherein introducing the treatment fluid into the at least one fracture is performed at matrix flow rates; and exposing the treatment fluid to at least one condition selected from the group consisting of: a temperature of greater than about 120° F., a pressure of greater than 1 atmosphere, acidic conditions, or a combination thereof, thereby cleaving the carbamate linkage of the curable compound and activating the amines thereof in the at least one fracture in the subterranean formation, wherein the activated amines react to form epoxides that crosslink and form a cured proppant pack in the at least one fracture in the subterranean formation.

2. The method of claim 1, wherein the compound of general formula (I) comprises:

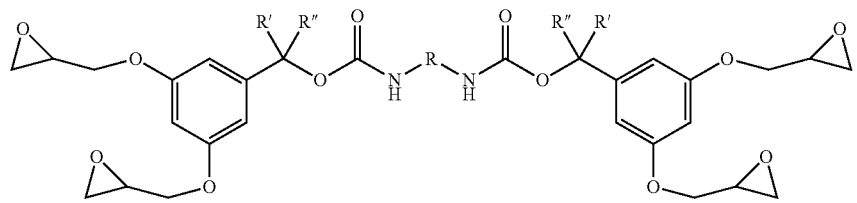

wherein R, R' and R" may be the same or different and comprise a cyclic or acyclic alkyl or alkenyl group of 1 to 20 carbon atoms.

3. The method of claim 1, wherein when the treatment fluid is placed into the at least one fracture, the slurry is exposed to a temperature of about 120° F. or greater to activate the latent curing agent to cure the curable resin to form the cured, resin-coated particulates.

4. The method of claim 1, wherein when the treatment fluid is placed into the at least one fracture, the slurry is exposed to a pressure of greater than 1 atmosphere to activate the latent curing agent to cure the curable resin to form the cured, resin-coated particulates.

5. The method of claim 1, wherein when the treatment fluid is placed into the at least one fracture, the slurry is exposed to acidic conditions to activate the latent curing agent to cure the curable resin to form the cured, resin-coated particulates.

6. The method of claim 1, wherein when the treatment fluid is placed into the at least one fracture, the slurry is exposed to basic conditions to activate the latent curing agent to cure the curable resin to form the cured, resin-coated particulates.

7. The method of claim 1, wherein at least a portion of the proppant is non-spherical.

8. The method of claim 7 where in the non-spherical proppant is cylindrical and has a diameter of about 0.08 inches and a length of about 0.12 inches.

9. The method of claim 1, wherein the carrier fluid is selected from the group consisting of oil-based fluid, aqueous-based fluids, aqueous-miscible fluids, water-in-oil emulsions, and oil-in-water emulsions.

* * * * *